US008401880B2

(12) United States Patent
Reddy et al.

(10) Patent No.: US 8,401,880 B2
(45) Date of Patent: Mar. 19, 2013

(54) COMPUTER RESERVATION AND USAGE MONITORING SYSTEM AND RELATED METHODS

(75) Inventors: Paul James Reddy, Auckland (NZ); Julian Joseph Sharpe, Auckland (NZ); David Andrew Teviotdale, Auckland (NZ); Patrick Gibb, Auckland (NZ); Peter James Riddell, Auckland (NZ)

(73) Assignee: Pharos Systems International, Inc., East Rochester, NY (US)

( * ) Notice: Subject to any disclaimer, the term of this patent is extended or adjusted under 35 U.S.C. 154(b) by 498 days.

(21) Appl. No.: 12/637,017

(22) Filed: Dec. 14, 2009

(65) Prior Publication Data

US 2010/0094998 A1 Apr. 15, 2010

Related U.S. Application Data

(62) Division of application No. 10/371,396, filed on Feb. 20, 2003, now Pat. No. 7,657,448.

(60) Provisional application No. 60/358,187, filed on Feb. 20, 2002.

(51) Int. Cl.
*G06Q 99/00* (2006.01)

(52) U.S. Cl. ............ 705/5; 705/32; 705/41; 709/223

(58) Field of Classification Search .............. 705/5, 32, 705/41; 709/223–224
See application file for complete search history.

(56) References Cited

U.S. PATENT DOCUMENTS

| | | | |
|---|---|---|---|
| 5,649,187 A | 7/1997 | Hornbuckle | 395/610 |
| 5,956,697 A * | 9/1999 | Usui | 705/32 |
| 6,745,242 B1 * | 6/2004 | Schick et al. | 709/224 |
| 6,944,667 B1 | 9/2005 | Curtis | 709/229 |
| 7,143,204 B1 | 11/2006 | Kao et al. | 710/18 |
| 7,457,859 B1 * | 11/2008 | Schick et al. | 709/223 |
| 7,580,889 B2 * | 8/2009 | Suzuki et al. | 705/41 |
| 8,132,209 B2 * | 3/2012 | Kaizu et al. | 725/51 |

(Continued)

FOREIGN PATENT DOCUMENTS

| | | |
|---|---|---|
| WO | 00/24160 | 4/2000 |
| WO | 00/36541 | 6/2000 |

(Continued)

OTHER PUBLICATIONS

"PC Cop Brochures", http://web.archive.org/web/20010615085304/http://www.cmsdiginet.com/Brochures/pdf_files/pc-cop_brochure.pdf. Retrieved Apr. 19, 2012.*

(Continued)

*Primary Examiner* — John Hayes
*Assistant Examiner* — Freda A Nelson
(74) *Attorney, Agent, or Firm* — Allen, Dyer, Doppelt, Milbrath & Gilchrist, P.A.

(57) ABSTRACT

A computer network may include a host computer and a plurality of computer workstations selectively connectable thereto at which user work sessions may be initiated. Each computer workstation when disconnected from the host computer (e.g., due to server outage, etc.) may advantageously initiate a user session responsive to a user request and store session information for updating the respective user account balance when reconnected with the host computer. Additionally, when the computer workstations are connected to the host computer they may copy respective user account balances from the host computer upon initiation of user sessions, and update the copied account balances based upon computer usage during the respective user sessions. The computer network may also include at least one reservation computer for cooperating with the host computer to schedule user session reservations and provide a requesting user an estimated time before a user session will be made available.

11 Claims, 8 Drawing Sheets

U.S. PATENT DOCUMENTS

| | | | |
|---|---|---|---|
| 2001/0044786 A1 | 11/2001 | Ishibashi | 705/77 |
| 2002/0061740 A1 | 5/2002 | Lautenschlager et al. | 455/406 |
| 2002/0174220 A1 | 11/2002 | Johnson | 709/224 |
| 2002/0174232 A1* | 11/2002 | Kikuta et al. | 709/227 |

FOREIGN PATENT DOCUMENTS

| | | |
|---|---|---|
| WO | 01/86423 | 11/2001 |

OTHER PUBLICATIONS

"PC Cop Brochures", Jun. 15, 2001, cmsdiginet.com, 7 pages.*

Software Solutions of Managing Public Access Terminals, Infopeople, Jun. 2001, infopeople.org, 6 pages.*

Schneider, *So They Won't Hate the Wait: Time Control for Workstations*, American Libraries, Dec. 1998, available at www.ala.org.

*Software Solutions for Managing Public Access Terminals*, Infopeople, Jun. 2001, available at www.infopeople.org.

*LibraryGuardian*, Guardianet Systems, Inc., 1996-2003, available at www.libraryguardian.com.

*Library Online Computer Booking and Time Control Module*, Telus Enterprise Solutions, 2000, available at www.sri.bc.ca.

Williams, *Internet Session Time Management Solutions*, Infopeople, Mar. 2000.

* cited by examiner

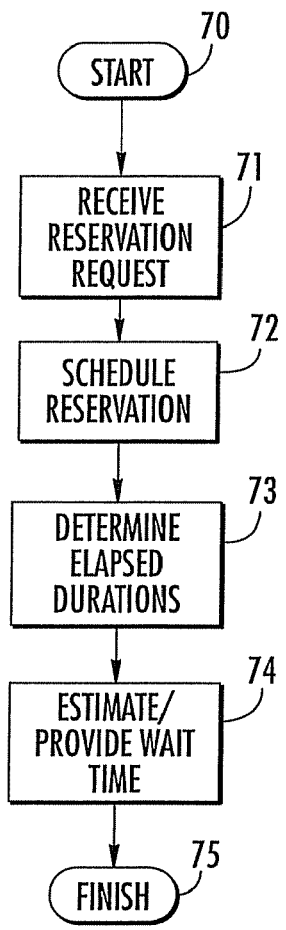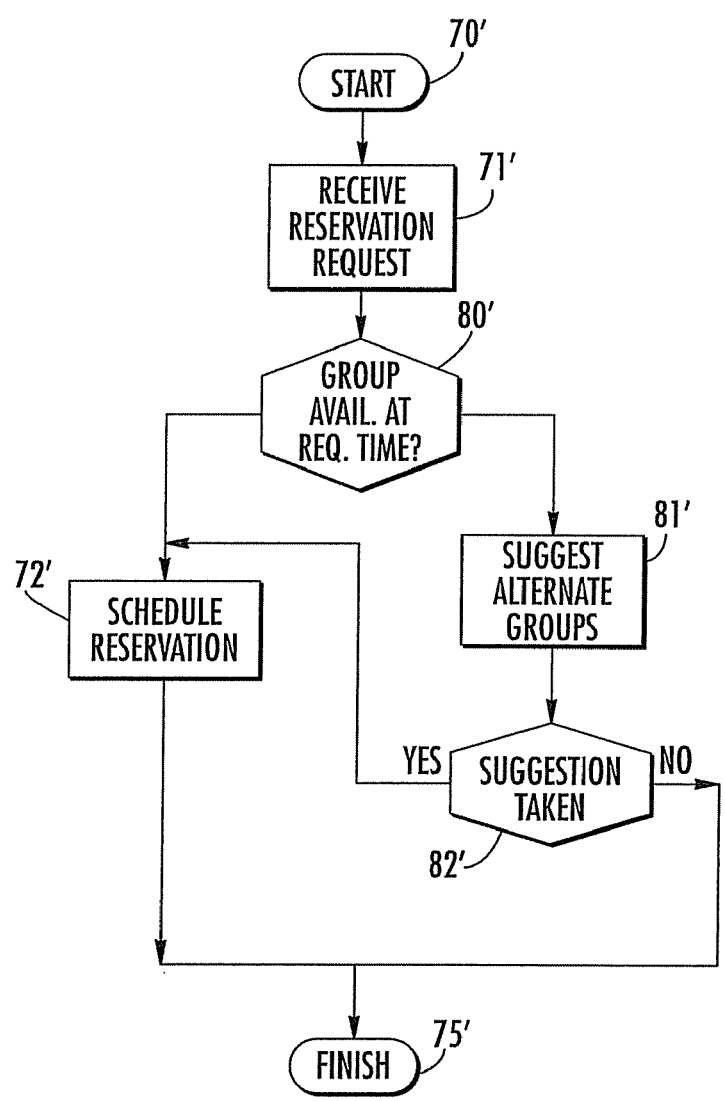
FIGURE 7
FIGURE 8

COMPUTER RESERVATION AND USAGE MONITORING SYSTEM AND RELATED METHODS

CROSS-REFERENCE TO RELATED APPLICATION

This application is a divisional patent application of U.S. patent application Ser. No. 10/371,396 filed Feb. 20, 2003 now U.S. Pat. No. 7,657,448, which claims the benefit of U.S. Provisional Application No. 60/358,187, filed Feb. 20, 2002, both of which are hereby incorporated herein in their entireties by reference.

FIELD OF THE INVENTION

The present invention relates to the field of computer networks, and, more particularly, to monitoring and controlling the usage of computers in a computer network.

BACKGROUND OF THE INVENTION

Many institutions, such as libraries and universities, for example, provide computer workstations for use by patrons, students, or other users. Such computer workstations may be connected in a wide area network (WAN) or local area network (LAN) with a server or host computer which may provide access to the Internet, centrally located files or applications, etc. The computer workstations may also run local applications such as word processors, spread sheets, etc., for the users.

Of course, one difficulty which can arise in such cases is allocating the use of such computers in a fair manner to all users. That is, certain users may not follow usage rules and use the computers longer then they are allowed. This not only keeps other users from having an opportunity to use a workstation, but it also potentially puts support staff in the awkward and confrontational position of asking the user to cease using the computer or even leave the premises. Moreover, having to "police" the computer workstations can detract from the staff's ability to perform other functions.

To address such problems, various computer software programs have been developed to regulate the amount of time users can spend on a computer or workstation. Examples of "time out" software products, which log a user off of a computer after a predetermined session time limit has expired, include Time Limit Manager from Fortres Grand Corp. and Tempo from Hyper Technologies, Inc. Other software products provide even further computer network management capabilities, such as the ability to reserve computer workstation sessions in advance. One such product is PC Cop from Card Meter Systems, Inc.

Another particularly advantageous computer reservation and time out software product is SignUp from Pharos Systems U.S.A., Inc., assignee of the present invention. In particular, SignUp is a system for reserving the use of public access computers. Workstations such as personal computers (PCs) can be reserved either in a queued situation in a walk-in environment or for immediate use by logging onto an idle PC. The use of PCs is monitored by the system and enforced. SignUp can reserve PCs for any user, subject to security restrictions, and allows different methods of reserving PCs. Furthermore, it provides scheduled access times for different groups of networked PCs, and it integrates seamlessly with other Pharos software to provide billing for the computer time used, pages printed, etc.

Despite the significant advancements provided in the area of computer reservation and time management by Pharos Signup, there may be certain occasions when additional functionality may be desirable. For example, most time out and reservation products require a user to be authenticated based upon user account information stored on the host computer or server. As such, when the server goes down, users are prohibited from initiating new user sessions at the workstations, and may perhaps be logged off existing sessions.

SUMMARY OF THE INVENTION

In view of the foregoing background, it is therefore an object of the present invention to, provide a computer network and related methods for providing enhanced computer reservation and time monitoring features and related methods.

This and other objects, features, and advantages in accordance with the present invention are provided by a computer network which may include a host computer and a plurality of computer workstations selectively connectable thereto. The host computer may store user account balances for a plurality of users. Also, the host computer and the computer workstations when connected may cooperate to initiate user sessions at the computer workstations responsive to user requests identifying the users if the requesting users have respective user account balances above a threshold balance. The host computer and computer workstations may also cooperate to update respective user account balances based upon the user sessions, and terminate the user sessions when respective user account balances fall below the threshold balance.

Moreover, each computer workstation when disconnected from the host computer may also advantageously initiate a user session responsive to a user request, and store session information for updating the respective user account balance when reconnected with the host computer. As such, when the host computer is down or otherwise unavailable, users will still have access to the computer workstations, and any requisite debits that need to be made to their user account balances may be done when the workstation and host computer are reconnected. Further still, the computer workstations may also terminate the user sessions when a session time limit has expired. This promotes fairness in computer workstation usage as it provides equal usage time to all users.

Additionally, when the computer workstations are connected to the host computer, the computer workstations may copy respective user account balances from the host computer upon initiation of user sessions, and update the copied user account balances based upon computer usage during the respective user sessions. That is, the computer workstations can keep a running user account balance during the session. By way of example, the user account balances may include time and/or monetary balances, which may be debited appropriately based upon the time or other resources (e.g., printed pages, etc.) a user consumes during his session. In accordance with this particularly advantageous aspect, of the invention, after termination of the user sessions the computer workstations may send updated user account balances to the host computer. As such, numerous communications need not be sent back and forth between the computer workstations and host computer during a session to keep account balances current, which reduces network traffic and processing requirements.

The computer network may also advantageously include at least one reservation computer for cooperating with the host computer to schedule user session reservations in advance of user sessions. In particular, the host computer and the at least one reservation computer may advantageously cooperate to provide a requesting user an estimated wait time before a user session will be made available based upon elapsed durations of user sessions in progress and a number of pending user session reservation requests.

Moreover, in certain embodiments the computer workstations may be assigned to one of a plurality of groups. Thus, if computer workstations from a given group are not available for user session reservations at a requested time, the host computer and the at least one reservation computer may cooperate to provide alternate user session reservations for computer workstations of another group that are available at the requested time. Further, the host computer and the at least one reservation computer may also cooperate to schedule user session reservations based upon a maximum number of allowable user session reservations and/or an amount of time that will elapse before the respective user session.

In addition, the host computers and computer workstations may also cooperate to determine total network usage based upon user sessions in progress and to allow user sessions to exceed the session time limit if the total network usage is below a threshold. The host computer may also advantageously store respective user settings for each user so that the computer workstations may cooperate with the host computer to implement user settings for respective users upon initiating user sessions. Thus, users need not re-configure their computer "desktop" each time they initiate a user session, but instead only have to do so once and these settings are implemented during later sessions.

Additionally, the host computer and the computer workstations may initiate the user sessions based upon other rules which can be defined by a network administrator. For example, these rules might include a number of allowable user sessions and/or a total usage time limit within a predetermined time period (e.g., a day).

A method aspect of the invention is for using a computer network, such as the one briefly described above. The method may include storing user account balances for a plurality of users at the host computer and, if the host computer and the computer workstations are connected, initiating user sessions at the computer workstations responsive to user requests identifying the users if the requesting users have respective user account balances above a threshold balance. Further, respective user account balances may be updated based upon the user sessions, and the user sessions terminated when respective user account balances fall below the threshold balance. Moreover, if a computer workstation is disconnected from the host computer, then the method may include initiating a user session at the computer workstation responsive to a user request, and storing session information at the computer workstation for updating the respective user account balance when reconnected with the host computer.

Another particularly advantageous aspect of the invention is directed to a computer-readable medium having computer-executable instructions for causing a computer workstation to perform various steps. In particular, when connected to a host computer, the steps may include receiving a user request to initiate a work session at the computer workstation, and cooperating with host computer to initiate a user session at the computer workstation if the requesting user has a respective user account balance stored at the host computer above a threshold balance. Additionally, the instructions may cause the computer workstation to cooperate with the host computer to update the user account balance based upon the user session, and terminate the user session when the user account balance falls below the threshold balance.

Additionally, when the computer workstation is disconnected from the host computer, the steps may further include initiating a user session at the computer workstation responsive to a user request, and storing session information at the computer workstation for updating the respective user account balance when reconnected with the host computer. Furthermore, instructions may also be included for causing the computer workstation, based upon a request from the host computer, to provide the host computer with a time remaining until the session time limit expires. As such, the host computer may use the estimated time from the computer workstations (and other computer workstations connected in a computer network) to provide a user requesting a computer reservation an estimated time when a user session will be available via a registration computer, for example.

BRIEF DESCRIPTION OF THE DRAWINGS

FIG. 7 is a flow diagram of a method for using the computer network of FIG. 3.

FIG. 8 is a flow diagram of an alternate embodiment of the method of FIG. 7.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternate embodiments.

The various features and advantages of the present invention may be implemented in a variety of computer systems, methods, and computer software applications, as will be described further below. In particular, the features of the invention are well suited for use in the Pharos software application Signup, noted above. As such, the prior art SignUp system will now be described with reference to FIGS. 9-13 as background to aid in understanding the subsequent description of the present invention.

More particularly, SignUp can require users to reserve their use of any computer workstation 101, such as a personal computer (PC), in a computer network 100. This provides better control over the use of network resources, more efficient use in a high demand environment, and the possible ability to spread load across workstations 101. The information gathered through the SignUp system allows more accurate assessment of any computer's value-in-use, produces evidence of the need to increase or reduce the quantities of any type of computer, and improves departmental budgeting by pinpointing cost over-runs and areas of need impact on users. Moreover, it may also encourage better pre-planning of specific tasks to ensure the computer(s) needed to complete it can be reserved in time, as well as reduce the use of computers for less necessary, personal or frivolous tasks, if appropriate in a given application.

Figure 9:
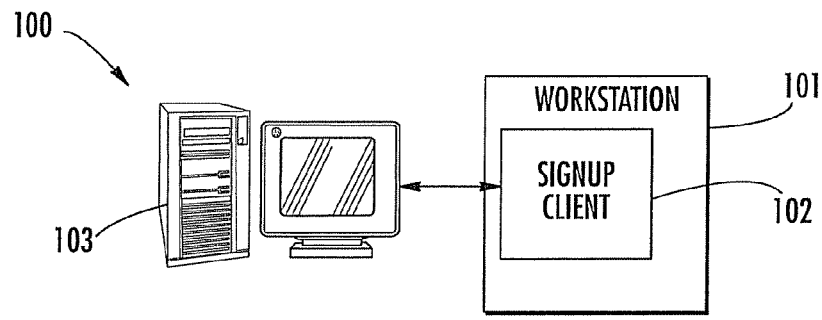
FIG. 9 is a schematic block diagram of a prior art computer network and reservation and time management system therefor.
Figure 10:
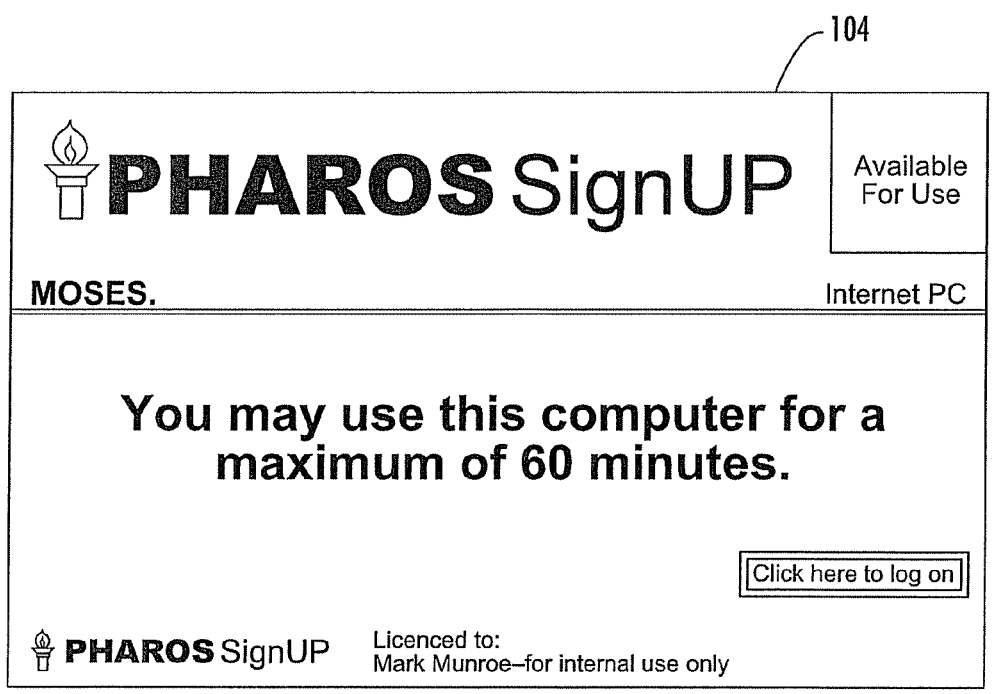
FIG. 10 is a computer screen printout of a log on screen for the prior art system illustrated in FIG. 9.
Figure 11:
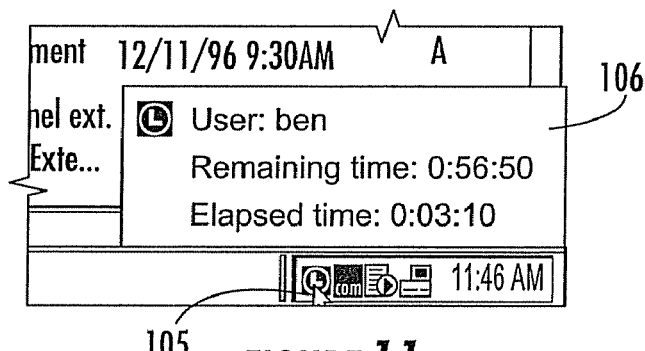
FIG. 11 is a screen printout illustrating an informational window generated by the prior art system illustrated in FIG. 9.

SignUp works as follows. A small application called a SignUp client 102 is installed on all user computer workstations 101 to be controlled. Only a single computer workstation 101 is shown in FIG. 9 for clarity of illustration, but any number of workstations may be used. The SignUp client application 102 runs in the background on all of the user workstations 101 and controls user access to the workstations. That is, each workstation 101 controlled by the SignUp system has a corresponding computer record in the database. The properties configured for a given workstation 101 affect its availability to users. These properties are sent to the SignUp client 102 via a SignUp service (described further below).

The SignUp client 102 ensures that all time quotas are enforced and that the workstation 101 is available for any queued reservations that have been assigned to it. It functions in conjunction with a SignUp server or host computer 103. However, the workstation 101 will work in standalone mode if the SignUp server 103 is unavailable. The SignUp client 102 requires all users to identify themselves before being able to use the workstation 101. A user is unable to log on unless they have reserved the workstation 101, or it currently has no reservations.

The SignUp client 102 is visible to users in three ways. The first is via the logon screen 104 (FIG. 10), which replaces the normal Windows logon dialog. When idle, it displays the status of the workstation 101, and when a user requests to initiate a user session on the workstation, the Signup client 102 prompts the user for their identification (ID) and password. These may be assigned ahead of time by a system administrator, for example.

Figure 12:
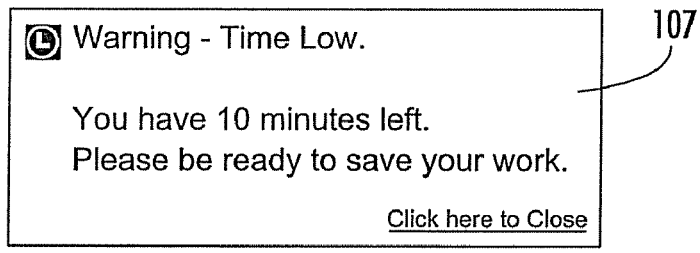
FIG. 12 is a screen printout of another informational window generated by the prior art system illustrated in FIG. 9.
Figure 13:
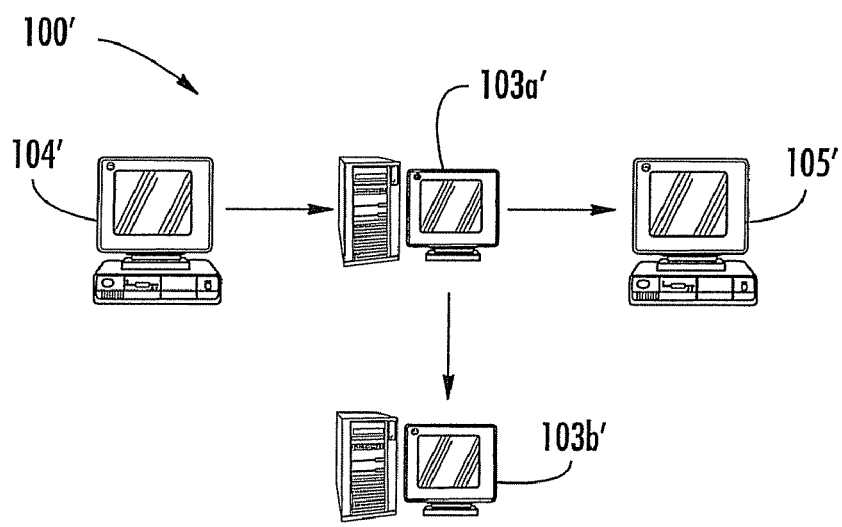
FIG. 13 is a schematic block diagram of a network computer configuration for implementing the reservation function of the prior art system of FIG. 9.

The second way in which the Signup client 102 is visible to the user during a session is when a SignUp icon 105 appears in the system tray. Hovering the mouse pointer over the icon 105 opens a window 106 showing the user how much time he has remaining in his session, as illustratively shown in FIG. 11. Third, the SignUp Client can also display a message window 107 to the user (FIG. 12). These messages may be system generated (e.g., warnings that the session is about to end), or sent to the user by a staff member using a management application.

Installing the SignUp client 102 software also inserts a workstation 101 entry into the database at the server 103. The SignUp client 102 controls access to the workstation 101, enforces all time/use quotas, and ensures that the workstation 101 is available for any reservations that have been assigned to it. Information on reservation sessions is communicated to the SignUp service at the SignUp server 103. As shown in the alternate embodiment illustrated in FIG. 13, the database and the SignUp service may be implemented on separate servers 103b' and 103a', if desired.

The SignUp service is Windows-based and runs on the server 103 or 103a' and manages all workstations 101 in a defined area, e.g., on one floor of a building. Multiple SignUp services may operate within the system or network 100. The SignUp service controls access to workstations 101 according to reservation requirements and the availability options configured for each workstation.

The SignUp service supplies the SignUp client 102 with its configuration information (e.g., where it is located, what type of computer it is, what types of reservations it will accept, between which hours it is available). When a user attempts to log on at a workstation 101 running the SignUp client 102, the SignUp client passes the details supplied by the user back to the SignUp service, which checks the details against the database. If the user is successfully authenticated, the SignUp service also returns details of any account information (e.g., reservation quotas, monetary balance, etc.) the user may have.

Where reservations are to be required, the user requests a workstation 101 at a dedicated reservation computer 104' set up as a station providing access to network services. This reservation computer 104' is connected to the SignUp service on the server 103a', which has an overview of all the available workstations 101. The SignUp service allows (or disallows) the user's reservation request on the spot. A SignUp service manages all workstations 101 in a defined area, e.g., one floor of a building. Many SignUp services may operate within the system. The SignUp service controls access to workstations 101 according to reservation requirements and the availability options configured for the given computer. Where reservations in advance are not required, users may begin sessions at any available workstation 101 simply by walking up and logging on.

When a queued reservation is made, the user first makes a reservation request and the SignUp service places a request in a queue which is displayed at a queue station 105', for example. As users are assigned workstations 101, they are directed to go to their respective workstation to start a session. The reservation is recorded in the database at the server 103b'.

Referring again to FIG. 9, when a reservation is activated, the user logs on to the workstation 101 and the SignUp client 102 sends the supplied details to the SignUp server 103. The SignUp server 103 informs the SignUp client 102 if the logon was successful. At the start of the session, the SignUp client 102 passes session details (e.g., start time) to the SignUp server 103. At the end of the session, the SignUp client 102 passes session details (e.g., finish time) to the SignUp server 103.

Figure 1:
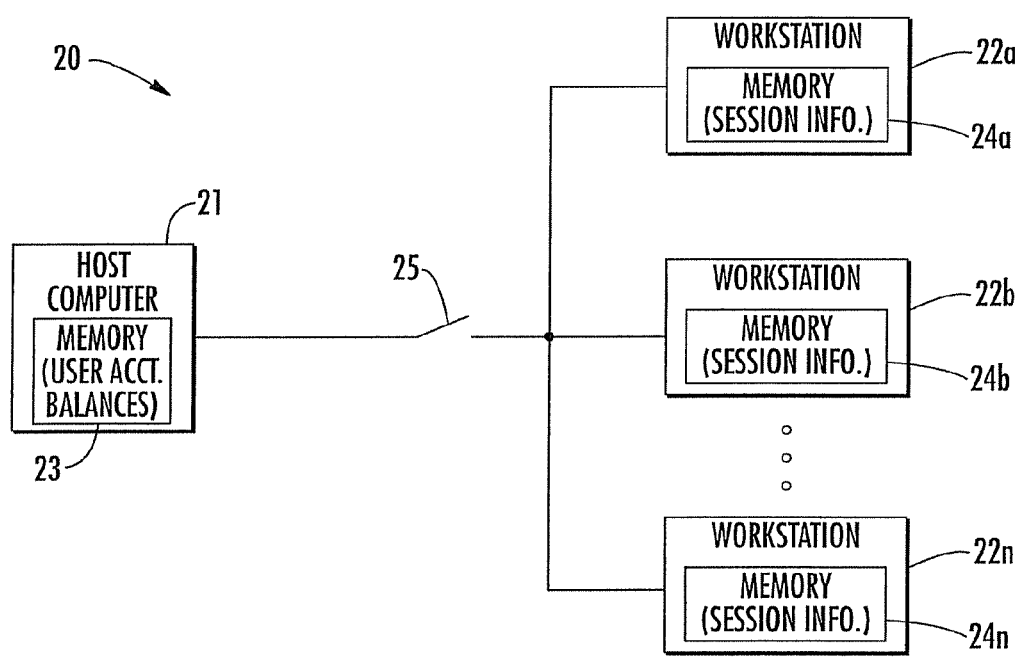
FIG. 1 is schematic block diagram of a computer network in accordance with the present invention.
Figure 4:
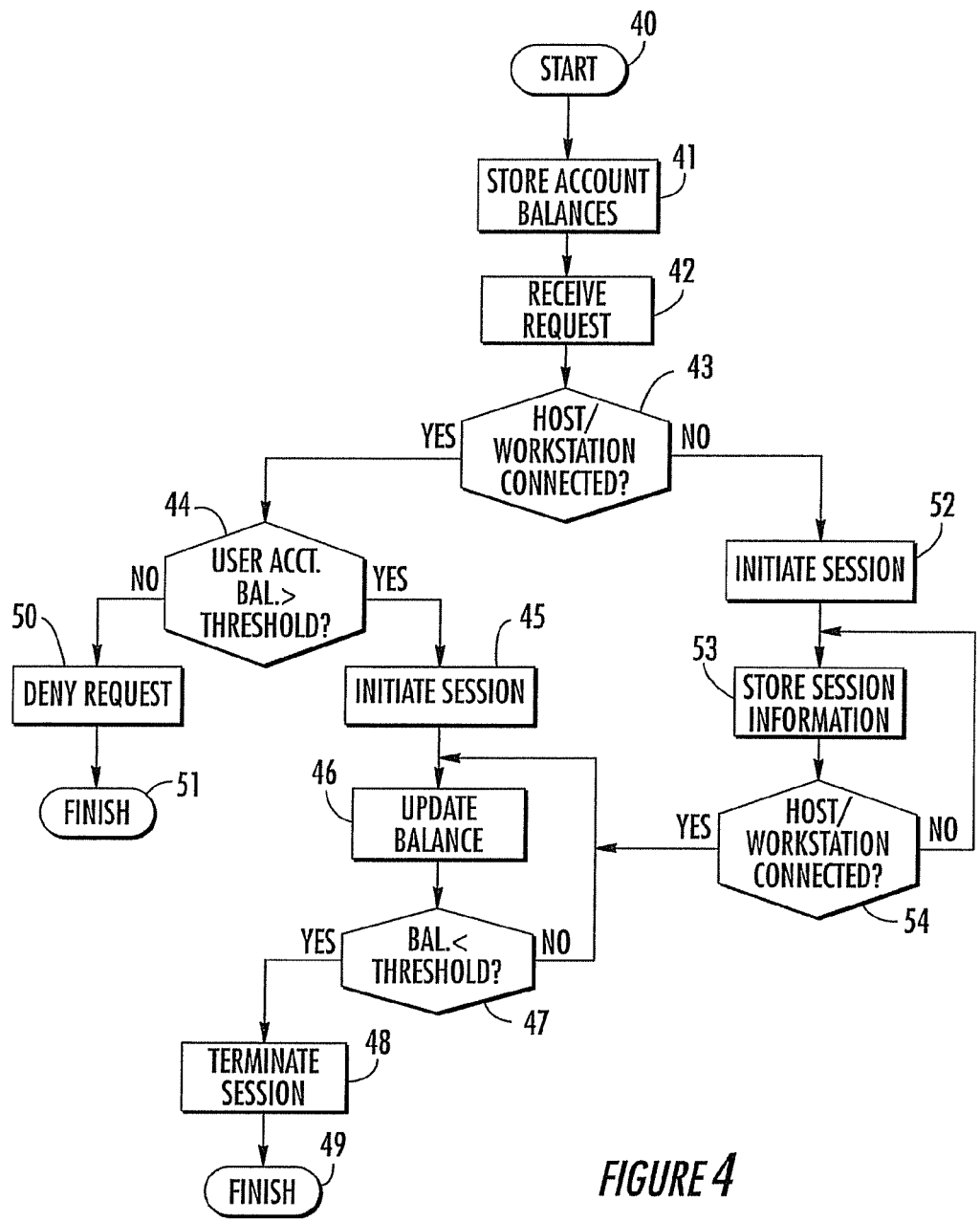
FIG. 4 is flow diagram of a method for using the computer network of FIG. 1.

With the foregoing background in mind, the various aspects and features of the present invention are now first described with reference to a computer system 20 and related method for using the same illustrated in FIGS. 1 and 4, respectively. In particular, the computer network 20 illustratively includes a host computer 21 (e.g., a server) and a plurality of computer workstations 22 selectively connectable thereto. The computer workstations 22 may run local or remote applications, for example, such as thin client applications, client server applications, Web-based applications, word processors, spread sheets, etc. By way of example, the computer workstations 22 may be PCs, but they could also be mainframe terminals, Macintosh computers, thin client or LINUX based, or other suitable workstations, as will be appreciated by those skilled in the art.

It should also be noted that the host device 21 could be a designated computer workstation 22, or the various host functions (which will be described further below) could be distributed among several computer workstations, such as in a peer-to-peer configuration, for example. Also, as used herein, reference to the host computer 21 and computer workstations 22 being "connected" simply means that, there is some data communication link therebetween. In the illustrated embodiment, this link is shown as a wired link, which could be a fiber or electrical data cable, for example, but wireless or other suitable communication links may also be used. Moreover, reference herein to the host computer 21 and computer workstations 22 being "disconnected" simply means that for some period data communication therebetween is disabled for whatever reason. For example, this could occur when the host computer 21 is turned off, it is taken offline, there is signal interference (such as in the case of a wireless link), a cable to the host computer is damaged or unplugged, etc.

The method begins (Block 40) with storing user account balances at the host computer 21, at Block 41, for the users authorized to use the computer system 20. The user account balances, which will be discussed further below, may be stored in a memory 23, as illustratively shown, which could be a hard disk drive or other suitable storage device, as will be appreciated by those of skill in the art.

Upon receiving a request to initiate a user session at a workstation 22, at Block 42, the workstation determines if it is connected to the host computer 21, at Block 43. If so, and if the requesting user has a respective user account balance above a threshold balance, at Block 44, then the computer workstation 22 cooperates with the host computer to initiate the user session at the computer workstation, at Block 45. The user request identifies the requesting user and, will typically include an individual user ID and password, although other suitable identifying indicia (e.g., biometrics, smart cards, etc.) may also be used. If the user's account balance is below the threshold balance, the host computer 21 will deny the request to initiate a session (and cause the workstation 22 to inform the user, such as through windows similar to the window 107), at Block 50, thus concluding the illustrated method (Block 51).

If the session is initiated, the host computer 21 and computer workstation cooperate to update respective user account balances based upon the user session, at Block 46. That is, the user account balance may be a time balance, in which case the host computer 21 can deduct from this balance as the user session progresses. Of course, the host computer 21 could make such deductions relatively continuously, periodically, or simply at the end of the user session. The time balance may be established in a variety of ways, such as by allotting an equal amount of time to all users, or simply allowing users to purchase various quantities of time.

Another approach is to use a monetary account balance. As such, if users are to be charged for the time they spend using a workstation 22, the appropriate amount of money can be deducted from the user account balances. A monetary account also provides the network owner the flexibility to bill for other functions performed during the user sessions beyond the time of computer usage, such as printing, for example. Of course, both monetary and time account balances could be maintained in a given application, if desired.

The host computer 21 and computer workstation 22 also cooperate during the user session to determine when a respective user's account balance falls below the threshold balance, at Block 47. Again, this could be determined based upon how long the user continues to use the workstation 22 in the case of a time balance, or the amount of funds remaining in the user's account after charges for time used and/or printing, etc. are deducted from a monetary account balance. It should also be noted that the threshold balance can be set to any desired value, even zero, depending upon the particular application and the network administrator's or organization's preferences or policies, for example, and could even be different users for different computer types.

If the user's account balance does fall below the threshold balance, then the host computer 21 and computer workstation 22 cooperate to terminate the user's session, at Block 48, concluding the illustrated method (Block 49). For example, when the host computer 21 updates the user's account balance based upon elapsed session time, print charges, etc., and the balance falls below the threshold balance, the host computer could then send an instruction to the workstation 22 causing it to terminate the session and notify the user accordingly. Other approaches for account updating and termination may also be used, as will be discussed further below.

In accordance with the invention, the computer network 20 advantageously provides for enhanced flexibility of operation when the host computer 21 and user workstations 22 are disconnected. In particular, when disconnected from the host computer 21 (Block 43), each workstation 22 can, on its own, initiate a user session responsive to a user request, at Block 52. The disconnection between the host computer 21 and workstations 22 is illustratively shown with an open switch 25 in FIG. 1 for clarity of illustration. Again, it should be remembered that as used herein "disconnection" does not mean solely a physical disconnection as in the case of an actual switch, rather it can be any event which causes the data communications between the host computer 21 and workstation(s) 22 to be interrupted, as noted above.

As will be appreciated by those of skill in the art, many typical time out and/or reservation systems do not allow a user to initiate a user session unless the user's account balance is first verified, which would not be possible when a data link to the host computer 21 is not established. Yet, the workstations 22 may be set to initiate such a "stand-alone" session when any valid identifier (e.g., a password having the correct number and/or type of characters) is entered, for example. Of course, other criteria for determining a valid password, biometric, etc. (or none at all) could be used.

Once the workstation 22 initiates the user session, the workstation then stores session information for updating the respective user account balance when reconnected with the host computer, at Block 53. The session information may be stored in memories 24 of the workstations 22, for example. Again, such memories may be hard drives, random access memories (RAMs), or any other suitable storage medium. Thus, in accordance with the present invention, users will still be able to use the workstations 22 during a host computer 21 outage, but any requisite charges that need to be made to their user account balances may advantageously be performed when the workstations and host computer are reconnected, at Block 54.

In the above described stand-alone mode, as much information is preferably cached at the workstations 22 as possible ahead of time (e.g., upon network initialization), giving the workstations the ability to function when the host computer 21 is unavailable (for whatever reason). The workstations 22 will be available for immediate (i.e., walk-up) reservations. Of course, if the host computer 21 comes back online while the session is still in progress, the workstations 22 will preferably check the user's account details and, if they are not valid or the user's account balance is below the threshold balance, the session is terminated as described above. Alternately, a workstation 22 can continue a session in progress if the host computer 21 becomes unavailable after the session is initiated.

Figure 5:
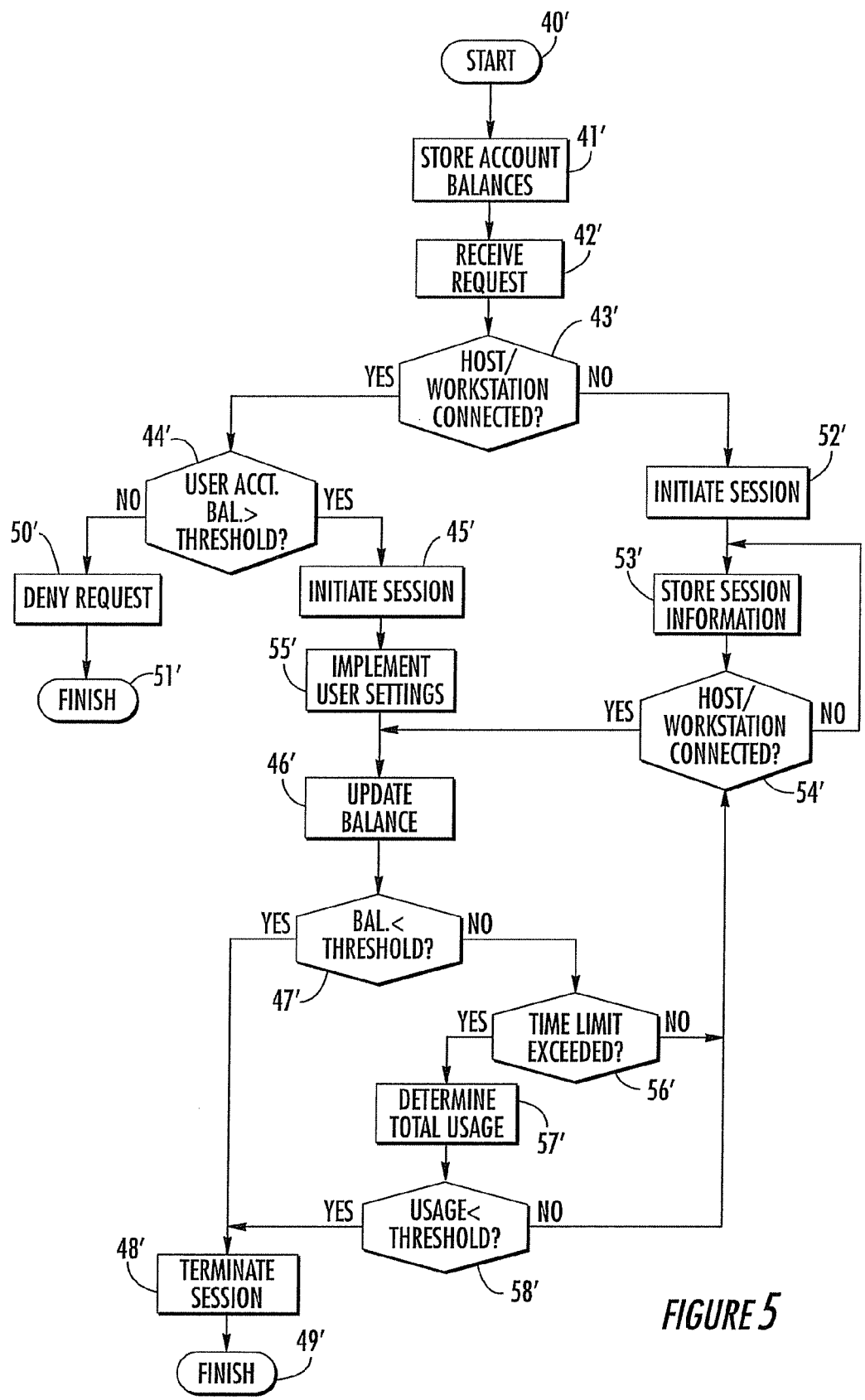
FIG. 5 is a flow diagram of an alternate embodiment of the method of FIG. 4.

Turning now additionally to FIG. 5, still further advantageous features may also be included in the above-described method and computer network 20. For example, the host computer 21 may also advantageously store respective user settings for each user so that the computer workstations 22 may cooperate with the host computer to implement user settings for respective users upon initiating user sessions, at Block 55'. Thus, users need not re-configure their computer "desktop" each time they initiate a user session, but instead only have to do so once and these settings will be implemented during later sessions, as will be appreciated by those skilled in the art.

Other network profiles and policies may also be stored at the host computer 21 and associated with the specified users' accounts, thereby controlling users' access to features of their desktop environment. Moreover, in some embodiments users can be logged onto the computer workstations 22 using a common guest account, and multiple environments may be set up to allow for multiple available guest logons, as will be appreciated by those skilled in the art.

Further still, the computer workstations 22 and/or computer host 21 also preferably implement a time out feature as described above. That is, the computer workstations 22 preferably determine when a session time limit has expired, at Block 56', at which time the session can be terminated (Block 48'). This promotes fairness in computer workstation usage as it provides equal usage time to all users. Of course, this could also be done on a resource usage basis. For example, a user could be limited to a certain amount of time on a pay service (e.g., LEXIS/NEXIS), processing time, volume of data use, bandwidth, etc.

The session time limit will typically be set ahead of time by a network administrator based upon the organization's policies or preferences, for example, and can be any desired duration. Additionally, the various time limits, rules, etc., could be dynamically adjusted by the host computer 21 based upon outages of computer workstations 22, loss of databases or Internet connections, or other events, for example. This can be done at the host computer 21, or at a workstation 22 or other network computer by entering an administrator identification or password which will allow the administrator to modify system settings stored at the host computer, for example, as well as circumvent other user rules.

Rather than immediately terminating a user session when the session limit expires, however, the host computer 21 and workstations 22 may optionally be set to advantageously cooperate and determine total network usage based upon user sessions in progress, at Block 57'. As such, if the total network usage is below a predetermined threshold, (e.g., a predetermined number of computers are not in use or reserved, etc.), at Block 56', the user sessions may then advantageously be permitted to exceed the session time limit, at Block 58'. Of course, the requisite threshold account balance can still be enforced (Block 47').

Figure 2:
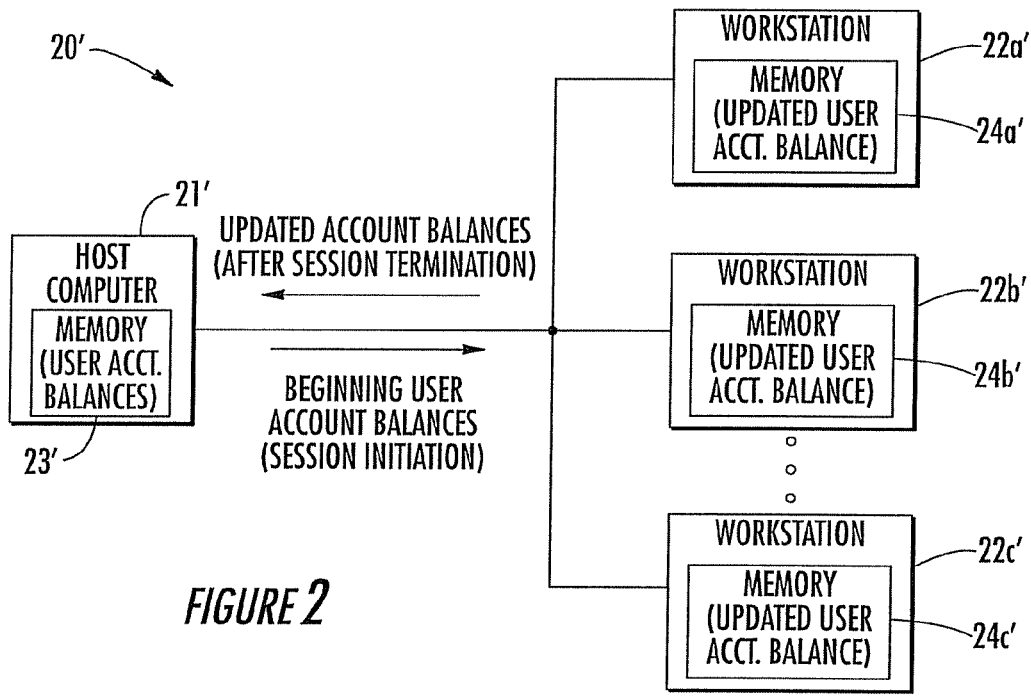
FIG. 2 is a schematic block diagram of an alternate embodiment of the computer network of FIG. 1.
Figure 6:
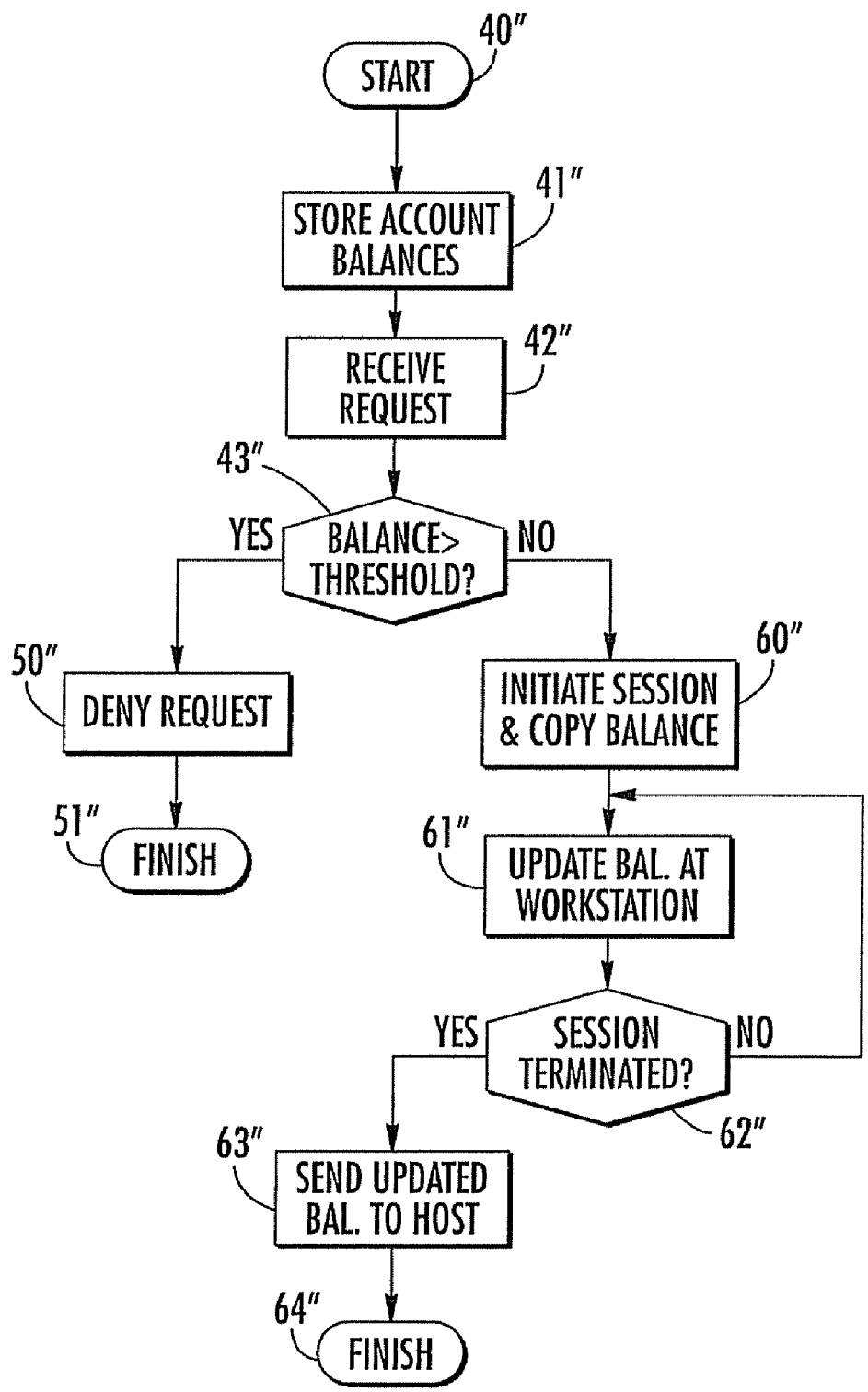
FIG. 6 is a flow diagram of a method for using the computer network of FIG. 2.

Turning now additionally to FIGS. 2 and 6, an alternate computer network 20' and related method for use thereof in accordance with the invention will now be described. In the illustrated embodiment, upon initiation of a user session, the computer workstation 22' in question copies the respective user's account balance from the host computer 21, at Block 60". Then, the user account balances stored at the computer workstation 22' are updated (Block 61") at the workstation based upon computer usage, printing, etc., during the respective user session. That is, the computer workstation 22' keeps a "running" user account balance during the session, which again may be time and/or monetary balances, as noted above.

In accordance with this particularly advantageous aspect of the invention, after termination of the user session, at Block 62", the computer workstation 22' sends an updated user account balance to the host computer 21', at Block 63", thus concluding the illustrated method (Block 64"). Such termination may be for any of the reasons set forth above or others (i.e., session time limit exceeded, account balance falls below minimum threshold known to the computer workstation 22', user log-off, power failure, etc.). As such, numerous communications need not be sent back and forth between the computer workstations 22 and host computer 21 to keep account balances current, which reduces network traffic as well as processing requirements.

Figure 3:
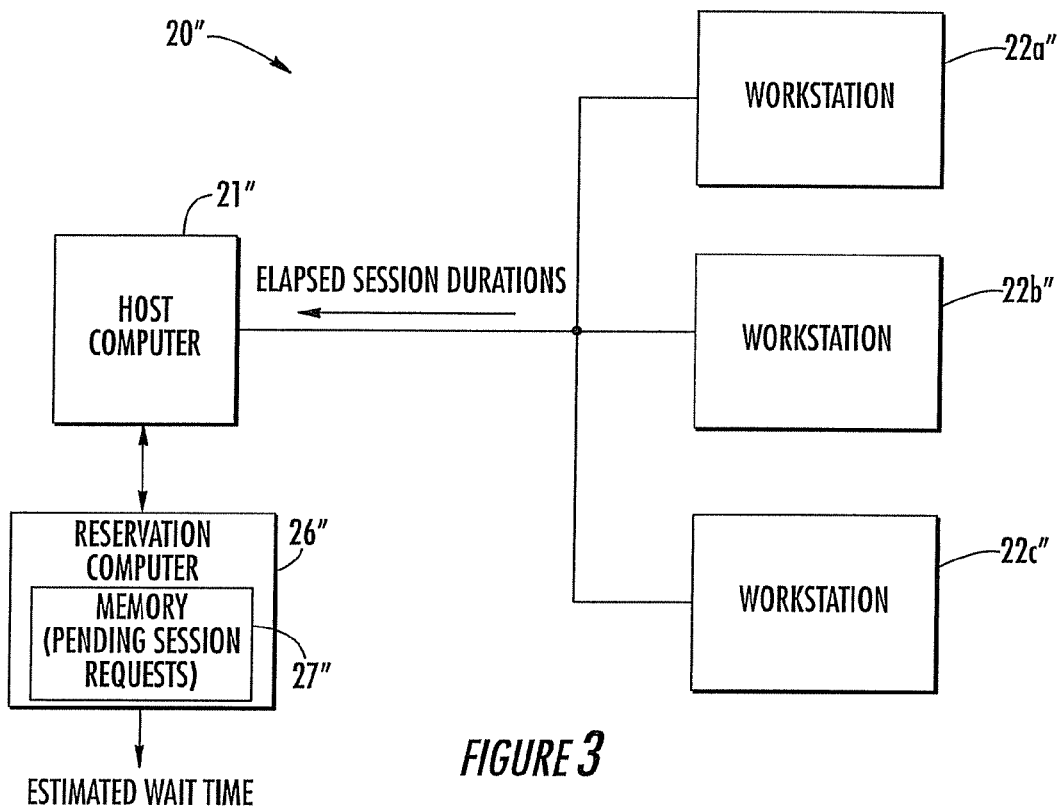
FIG. 3 is a schematic block diagram of yet another embodiment of the computer network of FIG. 1

Yet another advantageous computer network 20" and associated method for using the same will now be described with reference to FIGS. 3 and 7. In particular, the computer network 20" includes one or more reservation computers 26" for cooperating with the host computer 21" to schedule user session reservations in advance of user sessions, such as in the manner described above with reference to the existing SignUp software application. By way of example, the reservation computer 26" could be local (i.e., at the same location as the computer workstations 22"), or it could be remotely located and connectable to the host computer 21" via the Internet, etc., for example. In some embodiments, reservations could also be made via a telephonic interface as well, as will be appreciated by those skilled in the art.

In accordance with the invention, beginning at Block 70, once a reservation request has been received at the reservation computer 26", the host computer 21" and the reservation computer cooperate to schedule the reservation (if the appropriate account information/balance is verified). Further, they also advantageously cooperate to provide the requesting user an estimated wait time before a user session will be made available based upon elapsed durations of user sessions in progress and a number of pending user session reservation requests, at Blocks 73 and 74, thus concluding the illustrated method (at Block 75).

The pending session requests can be stored in a memory 27" at the reservation computer 26". Of course, they could also be stored at the host computer 21" (or elsewhere) if desired. It should also be noted that the reservation need not automatically be scheduled upon receipt of a reservation request, but the user may instead be allowed to decide whether to confirm a reservation based upon the estimated wait time. The manner in which the elapsed durations are determined will vary depending upon whether the host computer 21" or the workstations track the session times, for example.

If it is the latter, then the host computer 21" could poll the computer workstations 22" based upon a reservation request to get this information and either forward this information to the reservation computer 26" so that it can estimate the wait time, or the host computer could estimate the wait time and forward it to the reservation computer. Those of skill in the art will appreciate that several variations on this process are possible depending upon a given network configuration, and all such variations are included within the scope the present invention.

With additional reference to an alternate embodiment of the method illustrated in FIG. 8, the computer workstations 22" may be assigned to one of a plurality of groups. This could be done based upon the location of the workstations, intended computer use, workstation type (e.g., PCs, Macintosh computers, mainframe terminals, etc.) This could also be done based upon the applications available on a computer workstation 22", network policies/rules for computer use, user type (i.e., certain computers could be reserved for certain types of uses, patrons, etc.), computer configuration, and user profiles, for example.

If computer workstations 22" from a given group are not available for user session reservations at a requested time, at Block 80', the host computer 21" and the reservation computer 26" then cooperate to provide or suggest alternate user session reservations for computer workstations of another group that are available at the requested time. The order in which the various workstation types will be considered as alternatives will preferably be settable by the network administrator, e.g., as in the manner described above for making other network settings. If the user accepts the alternate reservation, at Block 82', then the reservation may be confirmed and scheduled, at Block 72'. The organization of computers may also be in two levels: branches (representing actual physical locations), and computer groups within those branches (representing the physical grouping of workstations 22" within a location). Some system properties can be configured globally across all branches, others apply per group.

Various other advantageous features may also be implemented in one or more of the above-described embodiments. For example, the host computer 21" and the reservation computer 26" may also cooperate to schedule user session reservations based upon a maximum number of allowable user session reservations and/or an amount of time that will elapse before the respective user session. For example, rules may be set to permit a user to only have two sessions in a given day, or a total usage time of two hours within a day. Of course, any number of settings and time limits may be used. Further, other rules and/or policies may be used to override current rules and/or policies and be effective within a given time period (e.g., rules may be implemented to prohibit user sessions during a given period regardless of user status or account balance).

The present invention also advantageously allows for the integration of the reservation computer 26" with other accounts/print/copy stations or computers. That is, certain prior art approaches allow a reservation system to be integrated with a print/copy management system to allow limited account maintenance from their reservation computer. According to the present invention, reservation, printing, copying, and/or account maintenance tasks may all advantageously be performed from one application running at the reservation computer 26" and/or host computer 21", for example. In addition, a scripting interface may also be provided to allow for customizable reservation rules.

It should also be noted that the above described aspects and features may advantageously be implemented in software or other computer-readable medium having computer-executable instructions for one or more of the above-described computers. Also, the various features discussed herein may be included in numerous different combinations other than the exemplary embodiments illustratively shown.

Moreover, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A computer network comprising:
   a host computer for storing user account balances for a plurality of users;
   a plurality of computer workstations cooperating with said host computer to initiate user sessions at the computer workstations responsive to user requests identifying the users; and
   at least one reservation computer for cooperating with said host computer to schedule user session reservations in advance of user sessions and provide a requesting user an estimated wait time before a user session will be made available based upon elapsed durations of user sessions in progress and a number of pending user session reservation requests;
   said host computer and plurality of computer workstations also cooperating to change a session time limit for the user sessions based upon a computer network outage;
   each computer workstation being configured to store session information when disconnected from said host computer for updating a respective user account balance when re-connected with said host computer.

2. The computer network of claim 1 wherein said computer workstations terminate the user sessions when a session time limit has expired.

3. The computer network of claim 1 wherein said computer workstations are each assigned to one of a plurality of groups; and wherein if computer workstations from a given group are not available for user session reservations at a requested time, said host computer and said at least one reservation computer cooperate to provide alternate user session reservations for computer workstations of another group that are available at the requested time.

4. The computer network of claim 1 wherein said host computers and computer workstations also cooperate to determine total network usage based upon initiated user sessions, and cooperate to allow user sessions to exceed the session time limit if the total network usage is below a threshold.

5. The computer network of claim 1 wherein said host computer also stores respective user settings for each user, and wherein said computer workstations cooperate with said host computer to implement user settings for respective users upon initiating user sessions.

6. The computer network of claim 1 wherein said computer workstations and said host computer cooperate to initiate the user sessions if the requesting users have respective user account balances above a threshold balance; and wherein said computer workstations and said host computer further cooperate to update respective user account balances based upon the user sessions, and terminate the user sessions when respective user account balances fall below the threshold balance.

7. The computer network of claim 6 wherein the user account balances comprise at least one of time balances and monetary balances.

8. A method for using a computer network comprising a host computer, at least one reservation computer selectively connectable to the host computer, and a plurality of computer workstations also selectively connectable to the host computer, the method comprising:
   scheduling reservations for user sessions at the computer workstations based upon user reservation requests using the at least one reservation computer;
   determining elapsed durations of user sessions in progress on the computer workstations using the at least one reservation computer; and providing a requesting user an estimated wait time before a user session will be made available using the at least one reservation computer based upon the elapsed durations of user sessions in progress and a number of pending user session reservation requests;

changing a session time limit for the user sessions based upon a computer network outage using the host computer and said plurality of computer workstations; and storing session information using each computer workstation when disconnected from the host computer for updating a respective user account balance when reconnected with the host computer.

9. The method of claim 8 further comprising terminating the user sessions when a session time limit has expired; and wherein providing further comprises providing the estimated wait time also based upon the session time limits.

10. The method of claim 8 further comprising:
storing user account balances for a plurality of users at the host computer; and
initiating the user sessions when available if the requesting users have respective user account balances above a threshold balance.

11. The method of claim 10 wherein the user account balances comprise at least one of time balances and monetary balances.

* * * * *